United States Patent [19]
Legille et al.
[11] Patent Number: 4,822,229
[45] Date of Patent: Apr. 18, 1989

[54] INSTALLATION FOR CHARGING A SHAFT FURNACE

[75] Inventors: Edouard Legille, L-Luxembourg; Emile Lonardi, L-Bascharage; Germain Schilz, L-Esch sur Alzette, all of Luxembourg

[73] Assignee: Paul Wurth S.A., Luxembourg, Luxembourg

[21] Appl. No.: 21,824

[22] Filed: Mar. 4, 1987

[30] Foreign Application Priority Data

Mar. 4, 1986 [LU] Luxembourg .......................... 86335

[51] Int. Cl.[4] .......................... B65G 69/00; F23K 3/06
[52] U.S. Cl. ...................................... 414/21; 414/199; 414/206; 414/216; 432/95
[58] Field of Search ................ 222/370, 144; 414/199, 414/204, 216, 217, 222, 160, 163, 21, 206; 432/95

[56] References Cited

U.S. PATENT DOCUMENTS

| | | | |
|---|---|---|---|
| 1,868,924 | 7/1932 | Spicknall | 414/199 X |
| 3,224,606 | 12/1965 | Schnyder | 414/217 |
| 3,693,812 | 9/1972 | Mahr et al. | 414/200 X |
| 4,029,220 | 6/1977 | Greaves | 414/161 X |
| 4,071,166 | 1/1978 | Legille et al. | 414/21 X |
| 4,074,816 | 2/1978 | Legille | 414/21 |
| 4,138,022 | 2/1979 | Mochizuki et al. | 414/216 X |
| 4,189,272 | 2/1980 | Gregor et al. | 414/163 X |
| 4,322,197 | 3/1982 | Mahr et al. | 414/21 X |
| 4,514,129 | 4/1985 | Legille et al. | 414/200 |

*Primary Examiner*—David A. Bucci
*Attorney, Agent, or Firm*—Fishman, Dionne & Cantor

[57] ABSTRACT

An installation for charging a shaft furnace equipped with a distribution spout, several storage containers, a sluicing system and a valve cage is presented. The containers are arranged next to each other and are horizontally displaceable between a first position aligned on the vertical axis of the shaft furnace, where the material is unloaded; and a second position laterally separated from the vertical axis of the shaft furnace, where the containers are filled.

12 Claims, 5 Drawing Sheets

INSTALLATION FOR CHARGING A SHAFT FURNACE

BACKGROUND OF THE INVENTION

This invention relates to an installation for charging a shaft furnace. More particularly, this invention relates to a shaft furnace charging apparatus of the type having a rotary or oscillating spout for distributing the charge material inside the furnace, comprising several containers for storing the charging material, a sluicing system for introducing the charge onto the distribution spout, and a valve cage which is mounted on the mouth of the furnace and has a flow duct controlled by a metering valve and a sealing valve.

Among the charging installations of this kind (usually referred to in the relevant art as "coneless throat" installations), there are generally two different types. The conventional type of installation is described in U.S. Pat. No. 3,693,812 ('812 patent) which is assigned to the assignee hereof. This apparatus has two storage containers above the furnace and arranged next to each other on either side of the vertical axis of the furnace. The two containers are connected by an inclined surface to a vertical flow duct above the distribution spout.

The second type of installation, which is more recent, is described in patent document EP-O-No. 062,770 corresponding to U.S. Pat. No. 4,514,129 ('129 Patent) assigned to the assignee hereof. This installation, which is more widely known in the art as a central feed installation, is characterized by two containers which are mounted one above the other symmetrically about the axis of the furnace. One of the containers acts as a sealing chamber.

Each of the two types of installations described above has its own advantages and drawbacks compared to the other type of installation. However, it will be understood the advantages of one are generally the drawbacks of the other and vice versa. Thus, one of the advantages of the conventional installation described in the '812 patent is that the two containers operate alternately, i.e., one is filled while the other one is emptied. This gives rise, aside from the relatively short time for operation of the valves as well as pressurization and depressurization, to an almost continuous charging operation. On the other hand, in the installation with two containers arranged one above the other described in the '129 patent, the charging operation must be interrupted during transfer of the charging material from the upper chamber to the lower chamber.

One of the drawbacks of the conventional installation ('812 patent) with two containers arranged next to each other is that the two containers must both be designed in the form of a lock chamber, thereby requiring, in addition to the two metering valves, two pairs of sealing valves. On the other hand, in the second type of installation ('129 patent), only one of the containers is in the form of a lock chamber, thereby reducing the number of sealing valves.

Another drawback of the installation with two chambers arranged next to each other ('812 patent) is that the flow of the charging material on the inclined surface provides the falling trajectory of the charging surface with a horizontal component, thereby altering the point of impact of the charging material on the distribution spout according to the position of the latter and depending on the chamber which is being emptied. Because of this phenomenon, irregular or asymmetrical distribution of the charging material inside the furnace results. On the other hand, in the type of installation with two containers arranged one above the other ('129 patent), the flow of charging material is vertical and symmetrical in relation to the central axis of the furnace, thereby permitting a more regular distribution inside the latter.

One of the drawbacks of the installation with two containers arranged one above the other ('129 patent), is its relatively significant height resulting from the arrangement of the containers one above the other. This is the reason why, in order to limit the overall height, there is a tendancy to provide containers which are wider and less high. However, the use of wider and shorter containers accentuates another known problem, i.e., that of separation of the particles inside the container according to their size. This phenomenon, which was considered in more detail in Luxembourg Patent Application No. 85/810 filed Mar. 15, 1986, becomes more marked as the diameter of the container increases and occurs more particularly in the second type of installation ('129 patent), since the separation effects inside each of the two containers are combined, thereby increasing the final separation effect. On the other hand, in the type of installation with two chambers arranged next to each other ('812 patent), the separation effect is less marked due to the fact that the chambers may be designed so as to be higher and less wide. Moreover, the separation effects inside the two chambers are not combined.

SUMMARY OF THE INVENTION

The above-discussed and other drawbacks and deficiencies of the present invention are overcome or alleviated by the apparatus for charging of a shaft furnace of the present invention. In accordance with the present invention, an improved charging installation of the type described above is provided which has both the advantages of the installation with two containers arranged next to each other (described in the '812 patent) and those of the installation with two containers arranged one above the other (described in the '129 patent); and which, does not have any of the above mentioned drawbacks associated with each. The charging installation of the present invention comprises at least two containers arranged next to each other and displaceable horizontally between a first position aligned on the vertical axis of the furnace, where the material is unloaded onto the distribution spout; and a second position which is laterally separated from the vertical axis of the furnace, and where the two containers are filled.

In a preferred embodiment, the containers are mounted on a rotating platform capable of revolving about a vertical axis parallel with the vertical axis of the furnace.

As a result of the novel structural arrangement of the present invention, it is possible to simultaneously fill one of the containers while emptying the other after which the container positions are reversed. While it is not possible to achieve the continuity of charge delivery of the known installation with two chambers arranged next to each other (on account of the time required to rotate the platform and reverse the positions of the containers) the operation is faster than in the installation with two containers arranged one above the other since the time required to transfer the charging material from the upper container to the lower container is gained. Moreover, the present invention has all the advantages of the central feeding system of the installation which has containers arranged one above the other, since the container being emptied is always located on the vertical axis of the furnace. Also, the problems relating to the height of the installation are precluded by the present invention, thereby making it possible to reduce the separation effect by providing the two containers with a more suitable elongated shape.

Preferably, each of the containers has an upper sealing valve and a lower check valve. The sealed connection between the container located in the first position and the valve cage is achieved by raising the valve cage through expansion of a bellows joint arranged between the valve cage and the mouth of the furnace.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
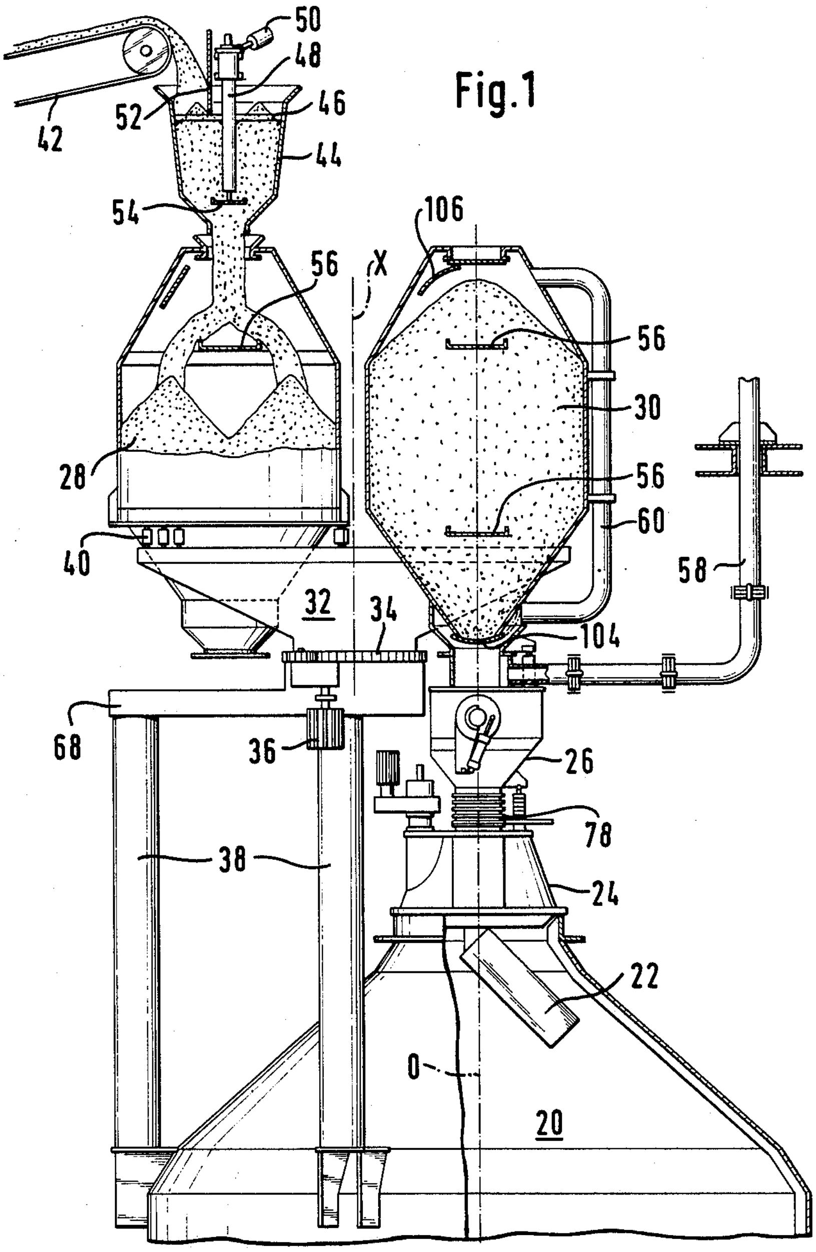
FIG. 1 is a front elevation view, partly in cross-section, of an installation with two rotating storage containers in accordance with the present invention.

FIG. 1 shows the top portion of a shaft furnace 20. A rotating spout 22 is mounted inside the mouth of shaft furnace 20 for distributing the charge material. Spout 22 is operated by a driving device 24, known per se, so as to rotate spout 22 about the vertical axis 0 as well as oscillating its angular position in relation to the latter. Driving device 24 has mounted above it a valve cage 26 of the type illustrated in U.S. Pat. No. 4,514,129.

Furnace 20 has mounted above it two storage containers 28 and 30 which, according to one of the features of the present invention, are displaceable by means of rotation about a vertical axis X parallel with the central axis 0 of the furnace, between a filling position in which container 28 is shown and an emptying position in which container 30 is shown. For this purpose, containers 28 and 30 are supported by a cradle 32 with a double fork shape (see also FIG. 2) resting on a rotating platform 34 which is operated by a motor 36 and which is supported by a frame 38 mounted on the mouth of furnace 20. Containers 28 and 30 do not rest directly on cradle 32, but are each supported by the latter via three groups of scales 40 and springs which enable, in a manner known per se, the contents of each of containers 28 and 30 to be permanently monitored (weighed) for automatic operation of the valves.

The charging material is brought, by means of a conveyor belt 42, into a hopper 44 located above the container which is in the filling position or, in the example shown, above container 28. Hopper 44 is suspended from a cross-piece 46 fixed horizontally on an axially rotating rod 48 which is driven in rotation by a motor 50. Rotation of hopper 44, while it is being filled leads to a considerable reduction in the separation of the particles which are transferred by feed belt 42, into the hopper. A vertical plate 52 fixed opposite conveyor belt 42 as well as a plate 54 which is fixed to the bottom end of rod 48 and is vertically displaceable under the action of a jack constitute additional measures which enable the separation effect inside hopper 44 to be reduced. The vertical position of plate 54 is adjusted in accordance with the level of material inside hopper 44, this level being measured by known level sensors. Plate 54 will be operated so as to keep a more or less constant volume inside hopper 44 depending on the material fed therein.

Preferably, means are provided to reduce separation inside storage containers 28 and 30 and consist of one or more plates 56 fixed inside the containers, along their axes, so as to cause distribution of the charging material falling from hopper 44, as shown in the example of container 28. Other means, such as those, disclosed in previously discussed Luxembourg Patent Application No. 85/810 filed Mar. 15, 1986, may also be provided.

The reference number 58 indicates a pressure equilization duct serving to pressurize the container located in the filling position, (or in the example shown, container 30) before the valves are opened in order to empty the charge material onto distribution spout 22, and to introduce air into this same container after the sealing valves have been closed and before the positions of containers 28 and 30 are reversed. In order to accelerate pressurization of the containers, each of the containers (not shown in the case of container 28 ) is provided with a branched pipe 60 connecting the bottom portion of the containers directly to their top portion. Pipe 58 must be provided with well known universal bellows joints so as to absorb the disjointing movement of valve 26, as well as movement of the furnace 20.

Figure 2:
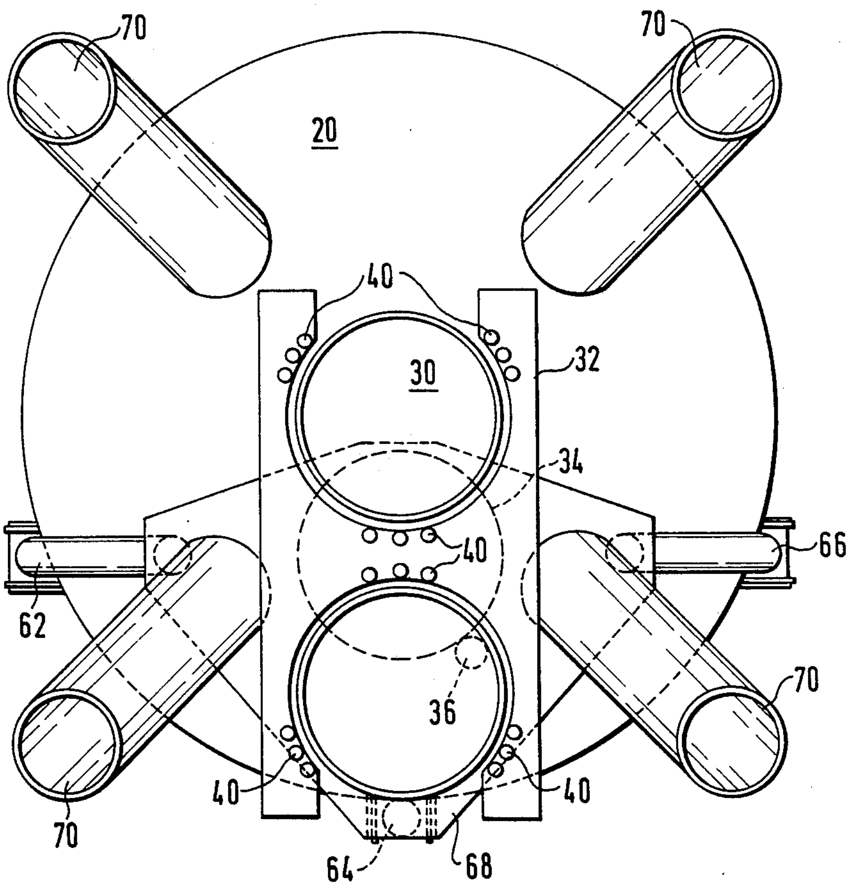
FIG. 2 is a plan view of the assembly of the two containers on the mouth of the furnace.

FIG. 2 illustrates the additional details of the assembly of containers 28 and 30. The frame, identified at 38 in FIG. 1, is comprised of three pillars 62, 64 and 66 mounted on the top of furnace 20 and supporting a horizontal platform 68. Rotating ring 34, driven by motor 35, rests, by means of roller bearings (not shown) on platform 68. Ducts for conveying the hot gases outside of furnace 20 are indicated by the reference numeral 70. It will be appreciated that rotation of cradle 32 about vertical axis X and reversal of the container positions are not impeded by ducts 70, which are inclined relative to the vertical.

So that the proposed installation is able to operate, means must be provided ensuring a sealed connection between each of the containers, 28 and 30 and the valve cage 26. These sealing means are illustrated by the partial cross-sections through the valve cage 26, shown in FIGS. 3–5.

To facilitate containers 28 and 30 being rapidly connected to valve cage 26 in a sealed manner, valve cage 26 is movable in the vertical axial direction and is connected, for this purpose, by means of a bellows joint 78 to the housing 80 of the mechanism 24 driving spout 22 (see also FIG. 1). Bellows joint 78 is associated with several, preferably three, positioning cylinders 82, each enclosing a sliding piston 84 subject to the action of a pressure spring 86. Under the action of spring 86 and the weight of valve cage 26, the cage will normally rest on cylinders 82, the bellows joint 78 being in its compressed position. Spring 86 is, moreover, necessary in order to compensate for the thrust of the furnace when no container is resting on cage 26.

Valve cage 26 also has an upper annular sealing surface 94 around which are fixed several, preferably three, hydraulic cylinders 88. Each of these cylinders has a piston with a vertical rod possessing an enlarged cylindrical head 92.

Figure 3:
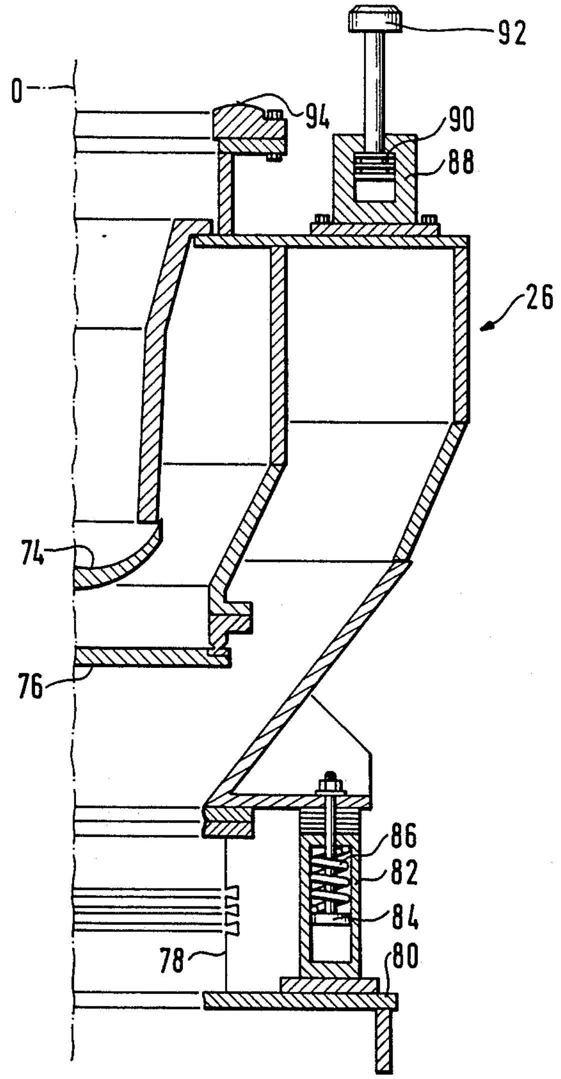
FIGS. 3 through 5 are cross-sectional views through the valve cage illustrating the different stages during connection of the valve cage to a storage container.

FIG. 3 shows the installation of the present invention during rotation of the two storage containers wherein the upper portion of valve cage 26 is disengaged and valves 74 and 76 must be closed. By way of a precautionary measure, a device preventing rotation of containers 28 and 30 when valves 74 and 76 are not closed may be provided.

Figure 4:
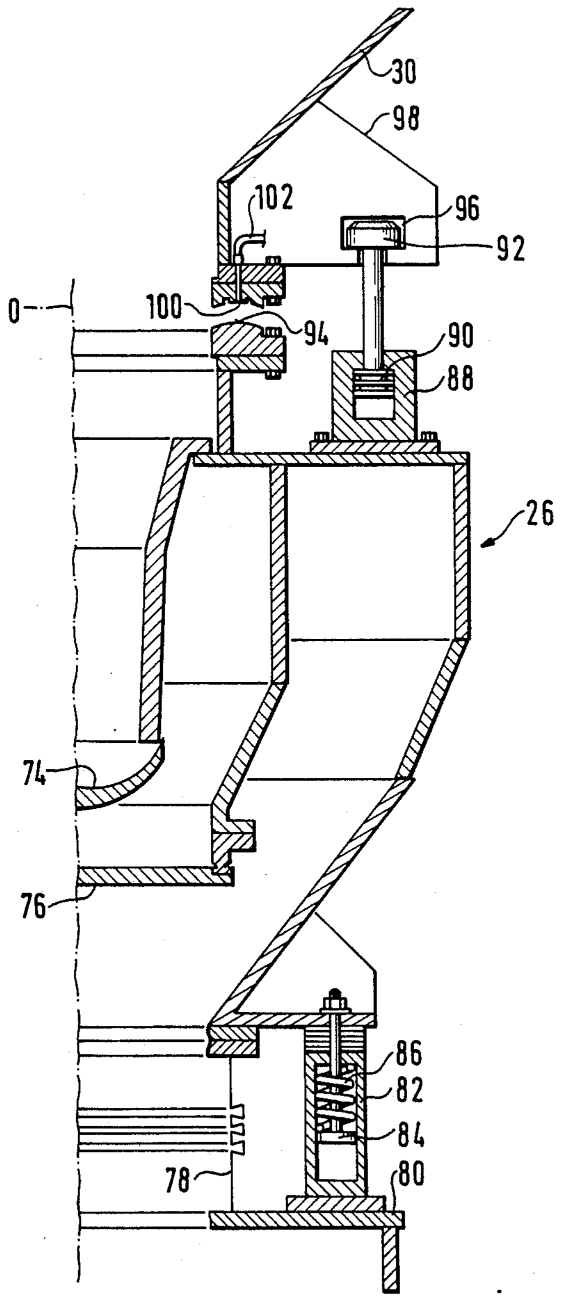

Each of containers 28 and 30 has, at its base, at locations corresponding to the positions of the hydraulic cylinders 88, flanks 98 provided with notches having a shape complementing that of head 92 of piston rods 90. When one of the containers, for example, container 30, is brought, by means of rotation, into the unloading position, as shown in FIG. 4, each of the notches 96 is engaged over one of the corresponding heads 92 of the hydraulic cylinders 88.

The lower flow duct of each of containers 28 and 30 is provided with an annular sealing surface 100 corresponding to the upper sealing surface 94 of valve cage 26. These two sealing surfaces 94 and 100 have a complementary shape which may be, for example, rounded and convex. Reference numeral 102 indicates a pressurized gas pipe 102 which leads into the central areas of the upper sealing surface. The purpose of gas pipe 102 is to clean the sealing surfaces and improve the sealing effect by injecting pressurized gas in the opposite direction.

Figure 5:
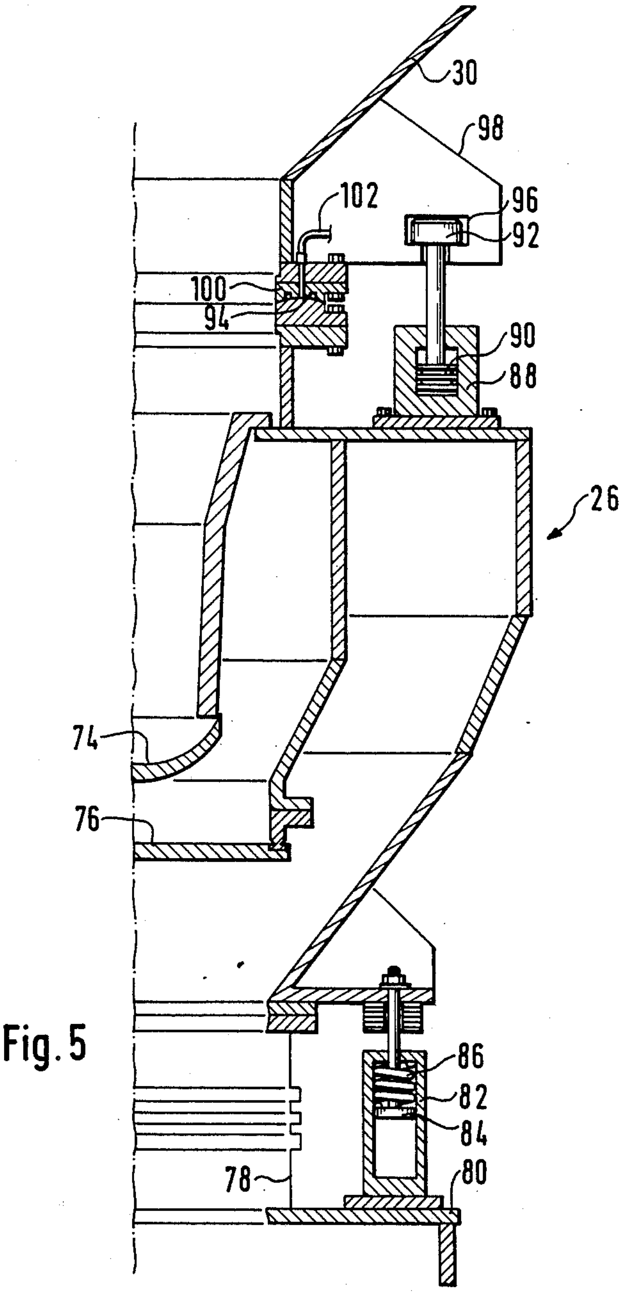

FIG. 5 shows the connection between container 30 and valve cage 26. This connection is achieved by injecting hydraulic fluid inside cylinders 88 on the rod side of the pistons until the sealing surfaces 94 and 100 are in contact with each other. Valve cage 26 is raised by pistons 84 which slide inside positioning cylinders 82 as a result of compression of springs 86 and expansion of bellows joint 78.

Disconnection of storage container 20 and valve cage 26 involves the same operations as for the connection described above with reference to FIGS. 3 to 5, but performed in reverse order.

Since each of containers 28 and 30 is disconnected from valve cage 26 during rotation about the axis X, they must necessarily be equipped with a lower check valve 104 in order to retain the charging material. Each of the containers 28 and 30 has, in addition, an upper sealing valve 106 similar to the conventional storage containers.

It should be understood that, instead of providing only two containers as in the embodiment described above, it is possible to provide three or even more of these containers, thereby reducing the time required for rotation.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An installation for charging a shaft furnace having a spout for distributing charge material inside the furnace, comprising at least two containers for storing the charge material, a sluicing system for introducing the charge material onto the distribution spout and a valve cage which is mounted on a mouth of the furnace and has a flow duct controlled by a metering valve and a sealing valve, and further comprising:

said at least two containers being positioned adjacent each other and each being displaceable horizontally between a first position aligned on the central vertical axis of the furnace wherein the charge material is unloaded from said containers onto the distribution spout, and a second position parallel to, but laterally offset from the central vertical axis of the furnace wherein said containers are filled with charge material; and a rotating platform, said containers being mounted on said rotating platform, said rotation platform capable of revolving about a vertical axis parallel with the vertical axis of the furnace.

2. The installation according to claim 1 including:

a cradle mounted on said rotating platform; and weighing means wherein at least two containers are supported by said weighing means on said cradle.

3. The installation according to claim 1 wherein each of said containers includes:

an upper sealing valve; and a lower check valve.

4. The installation according to claim 1 including:

a bellows joint between said valve cage and the mouth of said furnace; and wherein a sealed connection between the container located in the first position and the valve cage is achieved by raising the valve cage through expansion of said bellows joint.

5. The installation according to claim 4 including:

a plurality of hydraulic cylinders arranged on said valve cage for raising the valve cage, each of said cylinders having a piston rod, the head of each of said piston rods engaging a notch with a complementary shape, provided in the side walls of each of the containers during rotation of said containers when said valve cage is raised.

6. The installation according to claim 1 wherein each container includes:

a branched pipe for creating a pressurized atmosphere on either side of the charge material.

7. An installation for charging a shaft furnace having a spout for distributing charge material inside the furnace, comprising at least two containers for storing the charge material, a sluicing system for introducing the charge material onto the distribution spout and a valve cage which is mounted on a mouth of the furnace and has a flow duct controlled by a metering valve and a sealing valve, and further comprising:

said at least two containers being positioned adjacent each other and being displaceable horizontally between a first position aligned on the vertical axis of the furnace wherein the charge material is unloaded from said containers onto the distribution spout, and a second position laterally offset from the vertical axis of the furnace wherein said containers are filled with charge material;

a rotating platform, said containers being mounted on said rotating platform, said rotating platform capable of revolving about a vertical axis parallel with the vertical axis of the furnace;

a cradle mounted on said rotating platform; and weighing means wherein said at least two containers are supported by said weighing means on said cradle.

8. The installation according to claim 7 wherein each of said containers includes:

an upper valve; and a lower check valve.

9. The installation according to claim 7 including:

a bellows joint between said valve cage and the mouth of said furnace; and wherein a sealed connection between the container located in the first position and the valve cage is achieved by raising the valve cage through expansion of said bellows joint.

10. The installation according to claim 9 including:

a plurality of hydraulic cylinders arranged on said valve cage for raising the valve cage, each of said cylinders having a piston rod, the head of each of said piston rods engaging a notch with a complementary shape, provided in the side walls of each of the containers during rotation of said containers when said valve cage is raised.

11. The installation according to claim 7 wherein each container includes:

a branched pipe for creating a pressurized atmosphere on either side of the charge material.

12. An installation for charging a shaft furnace having a spout for distributing charge material inside the furnace, comprising at least two containers for storing the charge material, a sluicing system for introducing the charge material onto the distribution spout and a valve cage which is mounted on a mouth of the furnace and has a flow duct controlled by a metering valve and a sealing valve, and further comprising:

said at least two containers being positioned adjacent each other and each being displaceable horizontally between a first position aligned on the central vertical axis of the furnace wherein the charge material is unloaded from said containers onto the distribution spout, and a second position parallel to, but laterally offset from the central vertical axis of the furnace wherein said containers are filled with the charge material;

a bellows joint between said valve cage and the mouth of said furnace; and wherein a sealed connection between the container located in the first position and the valve cage is achieved by raising the valve cage through expansion of said bellows joint; and including a plurality of hydraulic cylinders arranged on said valve cage for raising the valve cage, each of said cylinders having a piston rod, the head of each said piston rods engaging a notch with a complementary shape, provided in the side walls of each of the containers during rotation of said containers when said valve cage is raised.

* * * * *